US012442519B2

(12) United States Patent
Fleuren et al.

(10) Patent No.: US 12,442,519 B2
(45) Date of Patent: Oct. 14, 2025

(54) OUTDOOR LUMINAIRE, STREETLIGHT FIXTURE AND OUTDOOR LIGHTING SYSTEM

(71) Applicant: SIGNIFY HOLDING B.V., Eindhoven (NL)

(72) Inventors: Noud Johannes Fleuren, Baarlo (NL); René Cornelis Reuser, Velp (NL); Nicolaas Antonie Van Rijswijk, Oss (NL); David Cavaliere, Prévost (CA); Ronald Johannes Gelten, Geldriop (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/845,033

(22) PCT Filed: Mar. 6, 2023

(86) PCT No.: PCT/EP2023/055618
§ 371 (c)(1),
(2) Date: Sep. 9, 2024

(87) PCT Pub. No.: WO2023/170002
PCT Pub. Date: Sep. 14, 2023

(65) Prior Publication Data

US 2025/0180194 A1 Jun. 5, 2025

(30) Foreign Application Priority Data

Mar. 11, 2022 (EP) .................................... 22161523

(51) Int. Cl.
*F21V 21/116* (2006.01)
*F21S 8/08* (2006.01)

(52) U.S. Cl.
CPC ............ *F21V 21/116* (2013.01); *F21S 8/085* (2013.01)

(58) Field of Classification Search
CPC ............... F21S 8/08; F21S 8/085; F21S 8/086
See application file for complete search history.

(56) References Cited

U.S. PATENT DOCUMENTS 9,726,360 B1 * 8/2017 Alexander ........... H01Q 19/185
10,249,932 B1 * 4/2019 Burrell ..................... H01Q 1/44
(Continued)

FOREIGN PATENT DOCUMENTS

DE 102019122612 A1 2/2021
WO WO-2014141312 A1 * 9/2014 ............. F21S 8/085
(Continued)

*Primary Examiner* — Alexander K Garlen

(57) ABSTRACT

Outdoor luminaire (100) comprising a housing (130) with a light exit window (150), a mounting element (120), a lighting unit (160) with a light source (170) accommodated in the housing and emitting light (180) through the light exit window. The housing further accommodating four antennas (210,220,230,240) with a respective directional radiation pattern (212,222,232,242) and a respective line of sight (214,224,234,244). The respective line of sights are mutually oriented in a manner similar to the four cardinal directions of a compass orthogonal to the direction of gravity when said luminaire is mounted. When the mounting element is surrounded by all four antennas the line of sight of all antennas are facing away from the mounting element, or when the mounting element is not surrounded by all four antennas, the mounting element is arranged outside the line of sight of the antenna facing towards the mounting element.

15 Claims, 8 Drawing Sheets

(56) References Cited

U.S. PATENT DOCUMENTS

| | | | | |
|---|---|---|---|---|
| 2007/0252528 | A1 | 11/2007 | Vermuelen et al. | |
| 2008/0175216 | A1* | 7/2008 | Nasco | F21S 8/086 370/338 |
| 2018/0035517 | A1* | 2/2018 | Den Boer | H05B 47/11 |
| 2018/0292056 | A1* | 10/2018 | Kim | F21V 33/0052 |
| 2019/0215935 | A1 | 7/2019 | Trublowski et al. | |
| 2019/0331333 | A1* | 10/2019 | Bukkems | F21V 29/60 |
| 2019/0341732 | A1* | 11/2019 | Aaron | H05B 47/11 |
| 2020/0053857 | A1* | 2/2020 | Chen | H05B 45/10 |
| 2020/0359462 | A1* | 11/2020 | Zimmerman, III | H04B 1/03 |
| 2020/0383173 | A1* | 12/2020 | Aaron | F21V 23/0435 |

FOREIGN PATENT DOCUMENTS

| | | | | |
|---|---|---|---|---|
| WO | WO-2022096601 | A1 * | 5/2022 | F21V 29/00 |
| WO | WO-2022253964 | A1 * | 12/2022 | H04B 1/38 |

* cited by examiner

OUTDOOR LUMINAIRE, STREETLIGHT FIXTURE AND OUTDOOR LIGHTING SYSTEM

CROSS-REFERENCE TO PRIOR APPLICATIONS

This application is the U.S. National Phase application under 35 U.S.C. § 371 of International Application No. PCT/EP2023/055618, filed on Mar. 6, 2023, which claims the benefit of European Patent application Ser. No. 22/161,523.0, filed on Mar. 11, 2022. These applications are hereby incorporated by reference herein.

FIELD OF THE INVENTION

The invention relates to outdoor lighting luminaires suitable for communication networks, streetlight fixtures comprising said outdoor luminaire, and outdoor lighting systems comprising a plurality of said outdoor streetlight fixtures, wherein the luminaires have a plurality of antennas mounted therein.

BACKGROUND OF THE INVENTION

Outdoor lighting systems have been designed and deployed to provide illumination to improve visibility in the absence of natural daylight throughout the outdoor environment, such as on streets, in parks, at airports, and other public and/or private outdoor venues. However, over the last two decades outdoor lighting systems have been evolving in part as a result of the proliferation of networked technology.

More recently omnidirectional radios were added to streetlights in outdoor lighting systems, such as disclosed in United States Patent Application US2007/0252528A1. These radios enable remote control of the lighting infrastructure using a wireless lighting control network and allow the individual streetlights or lighting fixtures to operate as a wireless mesh network, which, when combined with a central controller, allow a more versatile and flexible operation of the streetlights.

Over the last decade, there is a growing need for network connectivity, in particular in the smart city context. By deploying audio, video and environmental sensors municipalities want to better monitor and interact with the outdoor environment, this in combination with data collection and artificial intelligence allows for a better understanding and control of the urban environment. In addition, there is also a need for deploying a denser end-user communication service infrastructure, to enable new and/or higher quality services to users within the urban environment.

WO2014141312A1 discloses a street type led lighting body integrated with telecommunication devices.

SUMMARY OF THE INVENTION

Although outdoor lighting systems are good candidates for providing services beyond lighting, the uptake of connected lighting services does not appear to be in line with the need for such services. Several obstacles may be identified. Cost is an important obstacle for municipalities, although power generally is available at the location of legacy lighting fixtures, the communication infrastructure generally is not. Installing a wired data communication network to support the deployment of a data communication network within an outdoor lighting system can be very costly, as it requires closing and repairing post-installation the streets and/or sidewalks where such wired communication links are installed. Use of a wireless data communication network on the other hand will require mounting of additional wireless radio communication devices to the lighting fixtures which results usually rather unsightly pods or modules being mounted on lighting fixtures. Instead, the inventors propose to install a high-capacity data communication network in the outdoor lighting systems themselves, by embedding directional Radio Frequency, RF, communication equipment within the luminaires of the streetlights. Directional radio communication links here are beneficial in that they can reduce interference amongst adjacent devices. However, when integrating directional radios within luminaires, this also brings about a need to have a reliable performance and/or functionality of communication between the luminaires.

In view of the above, the present disclosure is directed to an outdoor luminaire, a lighting fixture and an outdoor lighting system that aim to ameliorate at least one of the problems discussed above. More particularly, the goal of this invention is achieved by an outdoor luminaire, a streetlight fixture and an outdoor lighting system as claimed in the appended claims.

In accordance with a first aspect of the invention an outdoor luminaire is provided comprising a housing having a center and comprising a light exit window. A mounting element is attached to or integrally formed by the housing and is configured to mount the luminaire onto a (pole) structure, wherein a luminaire axis extends through said center and said mounting element. A lighting unit comprising a light source is accommodated in the housing and said light source is emitting, in operation, an illumination light beam through the light exit window. The outdoor luminaire further comprising at least a first, a second, a third and a fourth antenna, each having respectively a first, a second, a third and a fourth directional radiation pattern and respectively a first, a second, a third, and a fourth line of sight as a respective a first, a second, a third and a fourth main direction of respectively the first, second, third and fourth directional radiation pattern. Said lines of sight are orthogonal to a first vertical axis along the direction of gravity and wherein the antennas together cover at least a 300 degrees range (preferably a 360 degree range) in the horizontal plane when said luminaire is mounted, and wherein the mounting element is positioned outside the line of sight of the antennas.

A first alternative way to express the invention is:

An outdoor luminaire comprising: a housing having a center and comprising a substantially flat light exit window; a mounting element attached to or integrally formed by the housing and being configured to mount the luminaire onto a structure; a luminaire axis extending through said center and said mounting element; a lighting unit comprising a light source, said lighting unit is accommodated in the housing, and said light source is emitting, in operation, an illumination light beam through the light exit window in an average beam direction at an angle Φ between 70-110 degrees with a plane P; and at least a first, second, third and fourth antenna substantially arranged in said plane P and each in a stacked position along the average beam direction with the light exit window, wherein the first, second, third and fourth antenna have respectively a first, a second, a third and a fourth directional radiation pattern and respectively a first, a second, a third, and a fourth line of sight as a respective first, second, third and fourth main direction of respectively the first, second, third and fourth directional radiation pattern, wherein said lines of sight are extending (substantially) in said plane P and wherein the antennas together cover at least a 300 degrees range in said plane P, and wherein the mounting element is positioned essentially in said plane P outside the line of sight of the antennas.

In the context of the invention, here the expression "substantially flat" is to be understood as plate shaped or a plate slightly curved over an angle of at the most 20°. In the context of the invention, here the expression "essentially" means: coincide with plane P, or extend/lying adjacently along plane P, or cross plane P at an acute angle of <=5°.

A second alternative way to express the invention is:

Outdoor luminaire, said outdoor luminaire comprising a housing having a center and comprising a light exit window, a mounting element attached to or integrally formed by the housing and being configured to mount the luminaire onto a (pole) structure; a luminaire axis extending through said center and said mounting element; a lighting unit comprising a light source, said lighting unit is accommodated in the housing, and said light source is emitting, in operation, an illumination light beam through the light exit window; and a first antenna unit comprising at least one first antenna having a first directional radiation pattern facing a first direction towards the mounting element when the luminaire comprises a single luminaire head and a first line of sight as a main direction of the first directional radiation pattern; and wherein the mounting element is positioned outside the first line of sight.

A third alternative way to express the invention is:

Outdoor luminaire, said outdoor luminaire comprising a housing having a center and comprising a light exit window; a mounting element attached to or integrally formed by the housing and being configured to mount the luminaire onto a (pole) structure wherein a luminaire axis extends through said center and said mounting element; a lighting unit comprising a light source, said lighting unit is accommodated in the housing, and said light source is emitting, in operation, an illumination light beam through the light exit window; and a first antenna unit having at least one first antenna having a first directional radiation pattern and a first line of sight along the luminaire axis, said first line of sight either:

i) facing a first direction towards the mounting element when the luminaire comprises a single luminaire head, or ii) facing in a direction away from the mounting element and along the luminaire axis when the luminaire comprises two mutually oppositely arranged luminaire heads; at least one further antenna comprised in the at least first antenna unit and having a further directional radiation pattern and a further line of sight facing a further direction, wherein said first and said further line of sight are within a plane orthogonal to a first vertical axis along the direction of gravity when said luminaire is mounted and said further direction being at an angle β with the first direction, wherein 70°<=β<=290°, and wherein the mounting element is positioned outside the first and further line of sight of the antennas.

A fourth alternative way to express the invention is:

Outdoor luminaire, said outdoor luminaire comprising a housing having a center and comprising a light exit window; a mounting element attached to or integrally formed by the housing and being configured to mount the luminaire onto a (pole) structure wherein a luminaire axis extends through said center and said mounting element; a lighting unit comprising a light source, said lighting unit is accommodated in the housing, and said light source is emitting, in operation, an illumination light beam through the light exit window; and a first antenna unit having at least one first antenna having a first directional radiation pattern and a first line of sight along the luminaire axis. The luminaire further comprising, a second, a third and a fourth antenna. The second antenna has a second directional radiation pattern and a second line of sight facing a second direction perpendicular to said first direction when the luminaire is mounted. The third antenna has a third directional radiation pattern and a third line of sight facing a third direction opposite to and away from said first direction and perpendicular to said second direction when the luminaire is mounted. The fourth antenna has a fourth directional radiation pattern and a fourth line of sight facing a fourth direction opposite to and away from said second direction and perpendicular to said third direction when the luminaire is mounted. Said first, second, third and fourth line of sight are within a plane P orthogonal to a first vertical axis along the direction of gravity when said luminaire is mounted. The mounting element is positioned outside the first, second, third and fourth line of sight of all four antennas, in that either i) when the mounting element is arranged in an area enclosed by all four antennas the line of sight of all antennas are facing away from the mounting element, or ii) when the mounting element is arranged outside the area enclosed by all four antennas, it is arranged outside the line of sight of the first antenna facing in the first direction towards the mounting element.

The invention relates to two basic configurations of the outdoor luminaire in which this blocking effect by the mounting element (and carrier) is counteracted, a first configuration relates to an outdoor luminaire having a single luminaire head accommodating all the antennas, and a second configuration relates to an outdoor luminaire having two luminaire heads that are mutually oppositely arranged and face away from each other and wherein the accommodation of the antennas is distributed over the two heads.

In order to cover at least 300-degree range, such as a 320 degree or preferably a 360-degree range, in the horizontal plane for communication purposes, the single head or two heads together of the outdoor luminaire comprises a plurality of antennas, i.e. at least a first antenna (also referred to as south-antenna or back-antenna), an oppositely arranged third antenna (also referred to as north-antenna or front-antenna) facing away from the first antenna and a second antenna (also referred to as east-antenna) and a fourth antenna (also referred to as west-antenna). The second and fourth antenna are also referred to as two side-antennas, the two-side antennas are oppositely arranged, facing away from each other and oriented in a transverse orientation with respect to the first and third antenna. An antenna typically has a radiation pattern with a transmission and/or receiving angle Θ in the horizontal plane (when the luminaire is mounted) up to and including 90 degrees, such as 60 degrees, 75 degrees or 80 degrees. Typically 45°<=Θ<=90°. So in the case Θ is 90 degrees and the luminaire is provided with four antennas, and the antennas are mutually oriented similar to the four cardinals of a compass, each antenna covers a respective, different quadrant of a circle in the horizontal plane, and thus a full circle is covered by said four antennas. Yet also antennas may be used wherein said angle is smaller than 90 degrees. Typically, to cover a full 360-degree range in the horizontal plane, then the outdoor luminaire may also comprise more than four antennas, for example five, six, eight twelve or even up to twenty-four antennas. For known outdoor luminaires, it has been found that for some luminaires the performance of the antenna facing towards the mounting element in the luminaire head, here referred to as the first antenna, is relatively poor. The reason is that in these known outdoor luminaires, antennas with a directional radiation pattern are used. Typically this radiation pattern and the line of sight of the first antenna facing towards the mounting element (when all the antennas are arranged in a single luminaire head) is (partly) blocked by the mounting element (and carrier, for example a pole) for arranging and mounting the outdoor luminaire.

For the single head configuration, by the proposed arrangement of (at least) the first antenna in a single head, for example in the canopy of said luminaire head, it is attained that (partly) blocking of the line of sight of said first antenna by the mounting element (and/or pole) is prevented or reduced. This can be attained by asymmetrically arranging the first antenna with respect to said two side-antennas. More preferably, said back-antenna is also asymmetrically arranged with respect to said front-antenna. Despite the fact that in terms of aesthetics and available space in said canopy, symmetric positioning of the antennas in the luminaire head is desired, the symmetric arrangement apparently is not the best solution for the attaining a 360-degree range in the horizontal plane for communication. Alternatively, the four antennas are mutually symmetrically arranged, yet rotated as a single unit by a slight angle α over a vertical axis with respect to the housing of the luminaire head.

For the two-head configuration, the four antennas can be arranged in two, mutually oppositely arranged heads (i.e. mutually rotated over 180° over a vertical axis) of the outdoor luminaire, said two heads preferably are identical to simplify the assembling of the complete outdoor luminaire and/or to keep the number of different outdoor parts relatively low. Each luminaire head comprises a respective housing having a respective center C and comprising a respective light exit window. By respective mounting elements of the respective luminaire head the housings of the luminaire heads are mounted onto a shared/common carrier, for example a light pole. Each housing accommodates a respective antenna unit with two respective antennas. The two antennas in the first luminaire head are considered to be the first and second antenna, and the two antennas in the second luminaire head are considered to be the third and fourth antenna. Each of the first, second third and fourth antennas has a respective line of sight. Said first, second, third, and fourth line of sight are within a plane P orthogonal to a vertical direction Vd, being the direction of gravity, in said mounted outdoor luminaire. The four antennas enclose an enclosed area EA, with the mounting elements are arranged within said enclosed area EA. Thus it can be attained that none of the four antennas faces towards a/the mounting element, i.e. all lines of sight of the antennas are facing in a direction away from the mounting element, and that (partly) blocking of the line of sight of said first antenna by the mounting element (and/or pole) is prevented or reduced.

As said, the light source emits a light beam through the light exit window. When the outdoor luminaire is a streetlight and its intended use is to illuminate a length portion of a road, typically such a light beam is elongated, for example is a batwing shaped beam having lobes. The batwing shaped beam is oriented with its lobes and/or with its elongated dimension perpendicular to the luminaire axis La and in the same direction as the second and fourth line of sight of the side antennas. Then not only the elongated light beams form a (continuous) light line in the length direction of the road, but also the communication between adjacent outdoor luminaire then is well aligned and enhances a relatively reliable and/or efficient communication along the length direction of the road. Typically the lobes of the batwing beam are oriented in accordance with the course of the road, and then (most likely self-evident) the second and fourth antennas have their line of sight oriented towards luminaires of adjacent streetlights on either side.

The (pole) structure onto which the outdoor luminaire is to be mounted must be strong enough to carry the weight of the outdoor luminaire. When the outdoor luminaire is arranged along the side of a road, such a structure mostly is a robust (light) pole-structure or a mast, for example made of metal, with internal electrical cabling to provide electrical power to the outdoor luminaire. Yet, other structures are also possible, like a brick wall, a fence, or a frame. The mounting element via which the outdoor luminaire is mounted to the carrier typically is at least one of a clamping bracket, a screw, a bolt-nut combination, a manchet, a tubular-shaped element, a hose clamp, tie-raps, etc.

In the context of the invention the expression “along” is to be understood as at an angle with the luminaire axis in a range of −20° to +20°, especially from −15° to +15°.

The directions of the four antennas could also be worded as: wherein the respective line of sights are mutually oriented in a manner similar to the four cardinal directions of a compass, similar to four cardinal directions of a compass. In the context of this invention, the expression “similar to four cardinals of a compass” is to be understood as two pairs of oppositely oriented antennas that mutually faces away i.e. wherein the antennas of a single pair are oriented at a mutual angle of 180°, and wherein the two pairs mutually are in a perpendicular orientation. In still other words, this antenna configuration may be worded as the four antennas forming two pairs of two antennas each, the antennas of each antenna pair facing in opposite directions and the two pairs of two antennas facing in orthogonal directions.

The outdoor luminaire may have the feature that (it comprises only a single luminaire head, wherein) said first radiation pattern is towards the mounting element and wherein first line of sight has an angle α with respect to said luminaire axis, wherein a is in a range from 3 to 20 degrees, preferably in a range from 5 to 15 degrees. This may be the case for only the first antenna, yet it may also be the case for some or all of the antennas. The outdoor luminaire may have the feature that the four antennas form a single unit which is rotated by an angle α, over an axis A essentially perpendicular to the vertical direction of gravity (when mounted) or horizontal plane P, wherein a is chosen such that the line of sight of the first antenna facing towards the mounting element has a line of sight just along the mounting element. The degree of rotation might depend on the size of the mounting element in the plane P and the distance between the first antenna and the mounting element in the plane P. Thereto, preferably a minimally is 3°, more preferably a minimally is 5°, yet, for other practical reasons, for example in that the second and fourth line of sight are oriented in a direction substantially along the two lobes of a batwing shaped beam of illumination light beam as emitted by the light source, α should be kept as small as possible, hence preferably α maximally is 25°, more preferably maximally 20°, most preferably α maximally is 15°.

The outdoor luminaire may have the feature that (it comprises only a single luminaire head, wherein) said first radiation pattern is towards the mounting element and wherein said first line of sight is located at a distance δ from said luminaire axis (La), wherein δ is at least half the width (W) of the mounting element in a direction in said plane P transverse to the luminaire axis. The outdoor luminaire could have the feature that the first antenna is in a shifted position with respect to the mounting element in plane P such that the mounting element is positioned outside the line of sight of the first antenna. Typically said distance δ preferably is at least 5 cm, more preferably at least 8 cm, most preferably at least 10 cm, preferably equal to or less than 30 cm, more preferably equal to or less than 25 cm, most preferably equal to or less than 20 cm. The shift of the first antenna with respect to the mounting element could be attained a shift of the single unit of the first, second, third and fourth antenna, in which case the first antenna remains symmetrically arranged with respect to the other (i.e. second, third and fourth) antenna. Yet, in a first alternative of such a shift, the shift of the first antenna with respect to the mounting element can also be attained by an asymmetrical arrangement of the first and third antenna with respect to the second and fourth antenna. In a second alternative of such a shift, the shift of the first antenna with respect to the mounting element can also be attained by an asymmetrical arrangement of the first antenna with respect to the second, third and fourth antenna. Yet, the outdoor luminaire could have the feature that said first direction is opposite to said third direction and said first line of sight is antiparallel (i.e. parallel but in an opposite direction, i.e. at approximately 180 degrees) to said third line of sight. The outdoor luminaire could then have the first antenna which is asymmetrically arranged with respect to the third antenna and mounting element. In an embodiment, the (center of said) third antenna unit is arranged on the luminaire axis. It is also possible that the outdoor luminaire comprises a combination of the rotation over said angle α and the shift over said distance δ of the first and/or more antennas, as long as this results in the mounting element being arranged outside the lines of sight of the antennas.

The outdoor luminaire may have the feature that said second direction is perpendicular to said first direction and/or said second line of sight is perpendicular to said first line of sight, wherein said fourth direction is opposite to said second direction and/or said fourth line of sight is antiparallel to said second line of sight, and wherein in a direction perpendicular to the luminaire axis the distance D1 between said at least one first antenna and said at least one second antenna is less than the distance D2 between said at least one first antenna and said at least one fourth antenna, wherein 0.5*D2<=D1<=0.9*D2 Hence, the first (south) antenna is asymmetrically arranged with respect to the second and fourth antenna.

The outdoor luminaire may have the feature that a virtual first line between the second and fourth antenna and a virtual second line between the third antenna and the mounting element mutually virtually cross to form a virtual cross shape, and the first antenna is asymmetrically arranged with respect to said virtual cross shape. In such a cross-shaped arrangement the angle between the line of sight of the first and second antenna, the second and third antenna, the third and fourth antenna and fourth and first antenna is 90° (i.e. β=90°). Also the direction of the radiation patterns of the four antenna is then essentially optimal for covering a 360° range in the horizontal plane for communication purposes. Furthermore, such a cross-shape is of a relatively simple construction.

The outdoor luminaire may have the feature that (in operation) the light beam is an elongated beam having a beam length direction and second and fourth direction are substantially along the beam length direction. Typically such an elongated light beam has an anisotropic light distribution having a first axis and a second axis perpendicular to said first axis. The first axis corresponds to the largest spatial light distribution of said light beam, wherein the second and fourth direction extend. In a similar aspect, the outdoor luminaire may have the feature that the light beam is a batwing beam with two lobes extending in a respective first and second lobe direction, and said second and fourth direction are substantially along a respective first and second lobe direction. Typically the elongated direction of the beam and/or the lobes of the batwing beam are oriented in accordance with the course of the road, and then (most likely self-evident) the second and fourth antennas have their line of sight oriented towards luminaires of adjacent streetlights on either side. Thus an improvement of communication between adjacent streetlight fixtures is attained.

The outdoor luminaire may have the feature that the number of antennas in the luminaire is four and the number of luminaire heads is two, wherein the two luminaire heads face in essentially opposite directions away from each other, wherein the four antennas are distributed as two antenna units over the two luminaire heads such that the respective line of sights are mutually oriented in a manner similar to the four cardinal directions of a compass and that all antennas face away from the mounting element(s) such that the mounting element(s) is/are outside the line of sight of all four antennas. Preferably, to simplify assembling and/or mounting and/or to reduce the number of different stock kept parts, the outdoor luminaire with two identical luminaire heads, i.e. each of the two luminaire heads comprises an antenna unit comprising an east and a north antenna and does not comprise a west and south antenna, or an antenna unit comprising a west and a north antenna and does not comprise an east and south antenna.

The outdoor luminaire may have the feature that each antenna is at least partly being accommodated in the housing, for example covered by a canopy. The housing provides protection against a mechanical and/or environmental impact from outside the housing. On the other hand, the housing might block the radiation patterns and/or lines of sight of the antenna involving the risk of a (partly) blocking effect of radiation patterns and/or lines of sight. Partly accommodating the antennas within the housing is an adequate compromise for both counteracting said blocking effect and obtaining said protection.

The outdoor luminaire may have the feature that is further comprises a modulation unit, internal to the housing, for use as a communication node in a wireless data network connected to the first, second, third and fourth antenna. The modulation unit is configured to generate one or more signal for transmission using the first, second, third and fourth antenna. When the outdoor luminaire comprises two luminaire heads, it is efficient and price-wise interesting to provide the modulation unit in only one of the two luminaire heads. The modulation unit may operate as a node in a point-to-point link or as a leaf node in a point-to multi-point radio communication system. The operating frequency for the first modulation unit is at least above 6 GHZ, and preferably in the mm Wave frequency range, ranging from 30 GHz to 300 GHz, more preferably in the 60 GHz band which spans roughly 51-71 GHz. The first modulation unit is preferably a MU-MUMO radio supporting directional links that use electronic beamforming, such known from IEEE 802.11ay-2021 style radios and/or Terragraph radios. The first modulation unit may, for example, comprise a base-band unit and an RF unit configured for driving a transmit signal over a feedline towards the first antenna unit comprising the at least one antenna. In case of bi-directional communication, the feedline is used alternatively to transport a received signal to the receiver. The directional antenna may be a passive directional antenna or an active directional array antenna. For the sake of brevity, the transmit signal here is referred to in singular, as it relates to the transmit signal for a single antenna. However as will be clear to those skilled in the art, when using electronic beamforming, the transmit signal comprises separate signals for the separate elements of the active array antenna.

The invention further relates to a streetlight fixture comprising an outdoor luminaire according to the invention. The streetlight fixture further comprises a (light) pole or mast as the carrier.

The invention still further relates to an outdoor lighting system comprising a plurality of, but at least two, streetlight fixtures according to the invention, wherein the plurality of (at least two) streetlight fixtures are mutually in mutual line of sight and/or communication.

The plurality of streetlight fixtures may number at least ten, thousand, or ten thousand or even over hundred thousand for very extensive communication networks covering a whole city, country and/or continent. Using the above antenna configuration in the fixtures of the outdoor lighting system, it is possible to create a mesh network using the radio nodes in luminaires located along a street. Utilizing at least three antennas per luminaire a mesh network may be implemented having a network topology resembling a ladder or, with four antennas per luminaire, a matrix structure, thereby offering redundancy and graceful degradation for connections along streets tolerant to obstructions such as trees, and/or to follow street layouts etc.

BRIEF DESCRIPTION OF THE DRAWINGS

In the schematic drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1A:
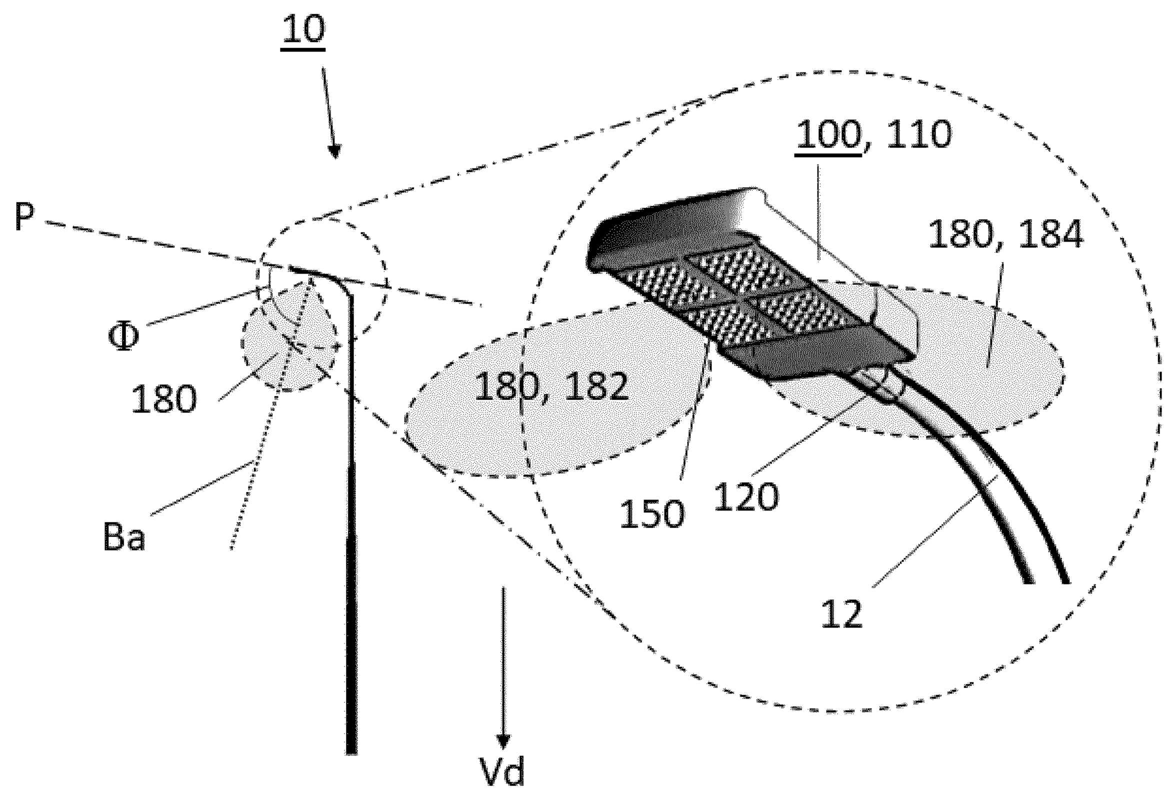
FIGS. 1A and 1B depict a first embodiment of a lighting fixture with an outdoor luminaire according to the invention.

FIG. 1A depicts a first embodiment of a streetlighting fixture 10 with a mounted outdoor luminaire 100 according to the invention. The luminaire 100 has a single luminaire head 110 and is mounted onto a pole 12 of the fixture 10 by a mounting element 120.

Figure 1B:
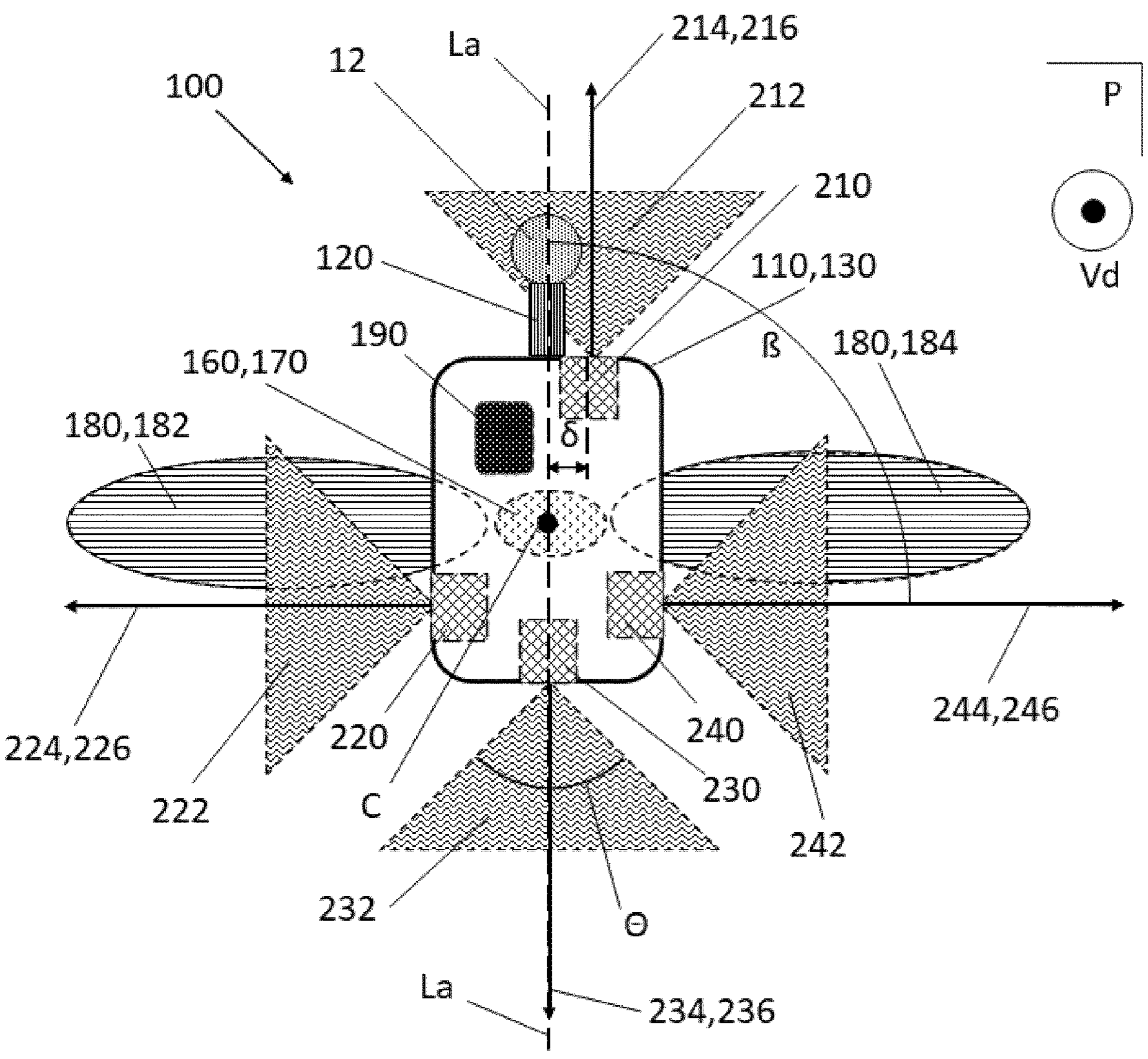

FIG. 1B depicts a detailed top view of the luminaire 100 of FIG. 1A. The outdoor luminaire 100 comprises a housing 130 having a center C and comprising a light exit window 150 (as shown in FIG. 1A). The mounting element 120 is integrally formed by the housing 130. A luminaire axis La extends through said center C and said mounting element 120. A lighting unit 160 comprises a light source 170 and is accommodated in the housing 130, and said light source 170 is configured to emit, in operation, a beam of illumination light 180 through the light exit window (not shown in FIG. 1B). The average beam direction Ba is at an angle Φ of about 80 degrees with a plane P. The housing further accommodates a modulation unit 190, a first 210 antenna and a second 220, a third 230 and a fourth antenna 240 as further antennas, said antennas essentially lying in said plane P and, seen along the average beam direction Ba, in a stacked position with the light exit window 150.

The first antenna 210 is configured to issue, in operation, a first directional radiation pattern 212 and has a first line of sight 214 as a first main direction (216) of the first directional radiation pattern (212), facing in the first direction 216 towards the mounting element 120. The further antennas, i.e. the second 220, third 230, and fourth antenna 240, are configured to issue, in operation, further radiation patterns, i.e. a second 222, third 232, and fourth radiation pattern 242, and have a further line of sight, i.e. a second 224, third 234, and fourth line of sight 244, as a respective second (226), third (236) and fourth main direction (246) of respectively the second (222), third (232) and fourth directional radiation pattern (242), facing in the further direction, i.e. a second 226, third 236 and fourth direction 246. The four radiation patterns 212,222,232,242 each have a transmission and/or receiving angle Θ of 90 degrees, and because of the mutual orientation of the four antennas a 360 degrees covering in the horizontal plane is attained. Said first 214, second 224, third 234, and fourth line of sight 244 are, preferably but not necessarily within a plane P, orthogonal to a vertical direction Vd, being the direction of gravity, in said mounted luminaire. As shown in the FIG. 1B, the first antenna 210 is asymmetrically arranged in the housing 130 and with respect to the further antennas 220,230,240 in that it is in a shifted position with respect to the mounting element 120, i.e. over a shift 8 in horizontal plane P, such that the mounting element 120 is being arranged in plane P, yet positioned outside the first line of sight 214 of the first antenna 210.

The four directions 216, 226, 236, 246 or lines of sight 214, 224, 234, 244 of the four antennas 210, 220, 230, 240 could also be worded as that the respective line of sights are mutually oriented in a manner similar to the four cardinal directions of a compass, i.e. said first direction 216 being at an angle β of essentially 90° with the second 226 direction 246, at an angle β of essentially 180° with the third direction 236, and at an angle β of essentially 270° with the fourth direction. In yet other words, the housing 130 accommodates two pairs of oppositely oriented antennas i.e. first pair, formed by the oppositely oriented first 210 and third antenna 230 facing away from each other, and a second pair, formed by the oppositely arranged second 220 and fourth antenna 240 facing away from each other, wherein the first and second pair mutually are in a perpendicular orientation.

The modulation unit 190 is configured for use as a communication node in a wireless data network connected to the first and further antennas, and is configured to generate first and further signals for transmission using the first and further antennas.

As shown in the FIGS. 1A-B, the light source emits a batwing shaped light beam 180 having lobes 182, 184. The batwing shaped beam is oriented with its lobes 182, 184 perpendicular to the luminaire axis La and in the same direction as the second 224 and fourth line of sight 244.

Figure 2:
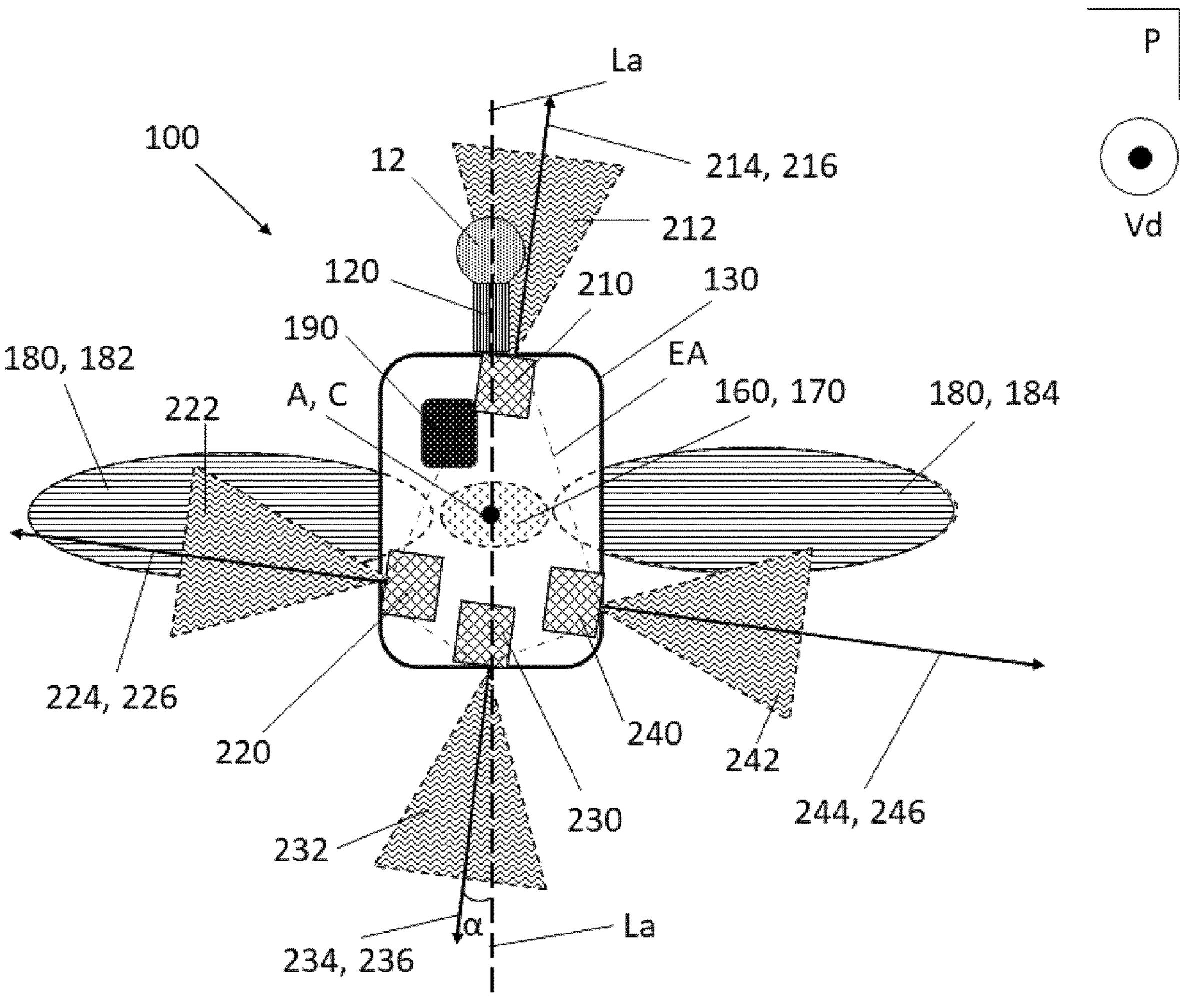
FIG. 2 depicts a second embodiment of an outdoor luminaire according to the invention.

FIG. 2 depicts a top view of a second embodiment of an outdoor luminaire 100 according to the invention. The luminaire 100 has a single luminaire head 110 and comprises an attached mounting element 120 for mounting onto a pole 12 of an outdoor fixture. The outdoor luminaire 100 comprises a housing 130 having a center C and comprising a light exit window (not shown). The housing 130 is attached to the mounting element 120. A luminaire axis La extends through said center C and said mounting element 120. A lighting unit 160 comprises a light source 170 and is accommodated in the housing 130, and said light source 170 is configured to emit, in operation, a beam of illumination light 180 through the light exit window. The beam of illumination light 180 comprises two lobes 182, 184. The housing further accommodates a modulation unit 190, a first 210 antenna and a second 220, a third 230 and a fourth antenna 240 as further antennas.

The first antenna 210 has a first line of sight 214 facing in a first direction 216 towards the mounting element 120. The further antennas, i.e. the second 220, third 230, and fourth antenna 240, have a further line of sight, i.e. a second 224, third 234, and fourth line of sight 244, facing in a further direction, i.e. a second 226, third 236 and fourth direction 246. Said first 214, second 224, third 234, and fourth line of sight 244 are within a plane P orthogonal to a vertical direction Vd, being the direction of gravity, in said mounted luminaire. The four antennas 210, 220, 230, 240 are mutually oriented in a manner similar to the cardinals of a compass, and as a result thereof so are the four lines of sight 214, 224, 234, 244, as explained with respect to FIG. 1B.

As shown in FIG. 2 the mounting element is arranged outside an enclosed area EA enclosed by the four antennas 210, 220, 230, 240, with the first antenna 210 facing towards the mounting element 120. As further shown in the FIG. 2, at least the first antenna 210 is asymmetrically arranged in the housing 130, but it is symmetrically arranged with respect to the further, i.e. second, third and fourth, antennas 220,230,240. In particular, in this embodiment all four antennas 210, 220, 230, 240 are rotated as a single unit of antennas by an angle α, over an axis A with respect to the luminaire axis La. Said axis A extends essentially through the center C and essentially perpendicular to plane P. Angle α is such that the first antenna 210 facing towards the mounting element 120 has a first line of sight 214 just passing along the mounting element. In the FIG. 2 α is about 8°. As a result of this slight rotation, the second 224 and fourth line of sight 244 are oriented in a direction substantially along the two lobes 182, 184 of the batwing shaped beam of illumination light 180 beam as emitted by the light source 170.

Figure 3A:
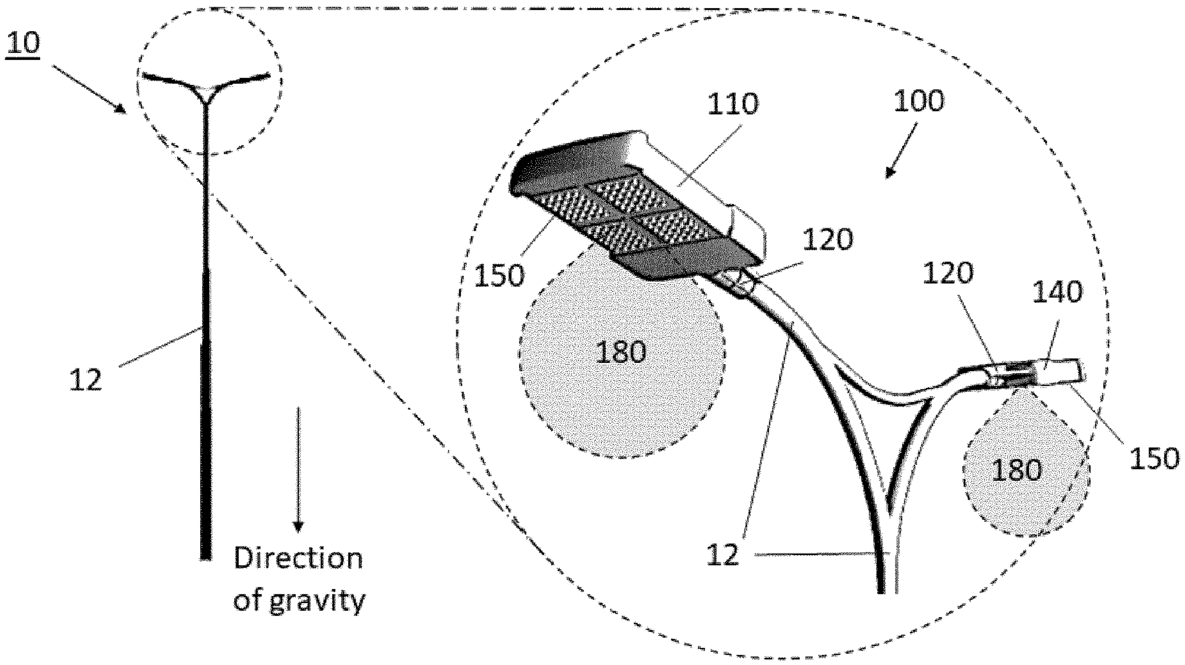
FIGS. 3A and 3B depict a third embodiment of a lighting fixture with an outdoor luminaire according to the invention.

FIG. 3A depicts a third embodiment of a streetlighting fixture 10 with a mounted outdoor luminaire 100 according to the invention. The luminaire 100 has a first luminaire head 110 oppositely arranged to a second luminaire head 140. Each luminaire head is mounted onto a same, single pole 12 of the fixture 10 by a respective mounting element 120.

Figure 3B:
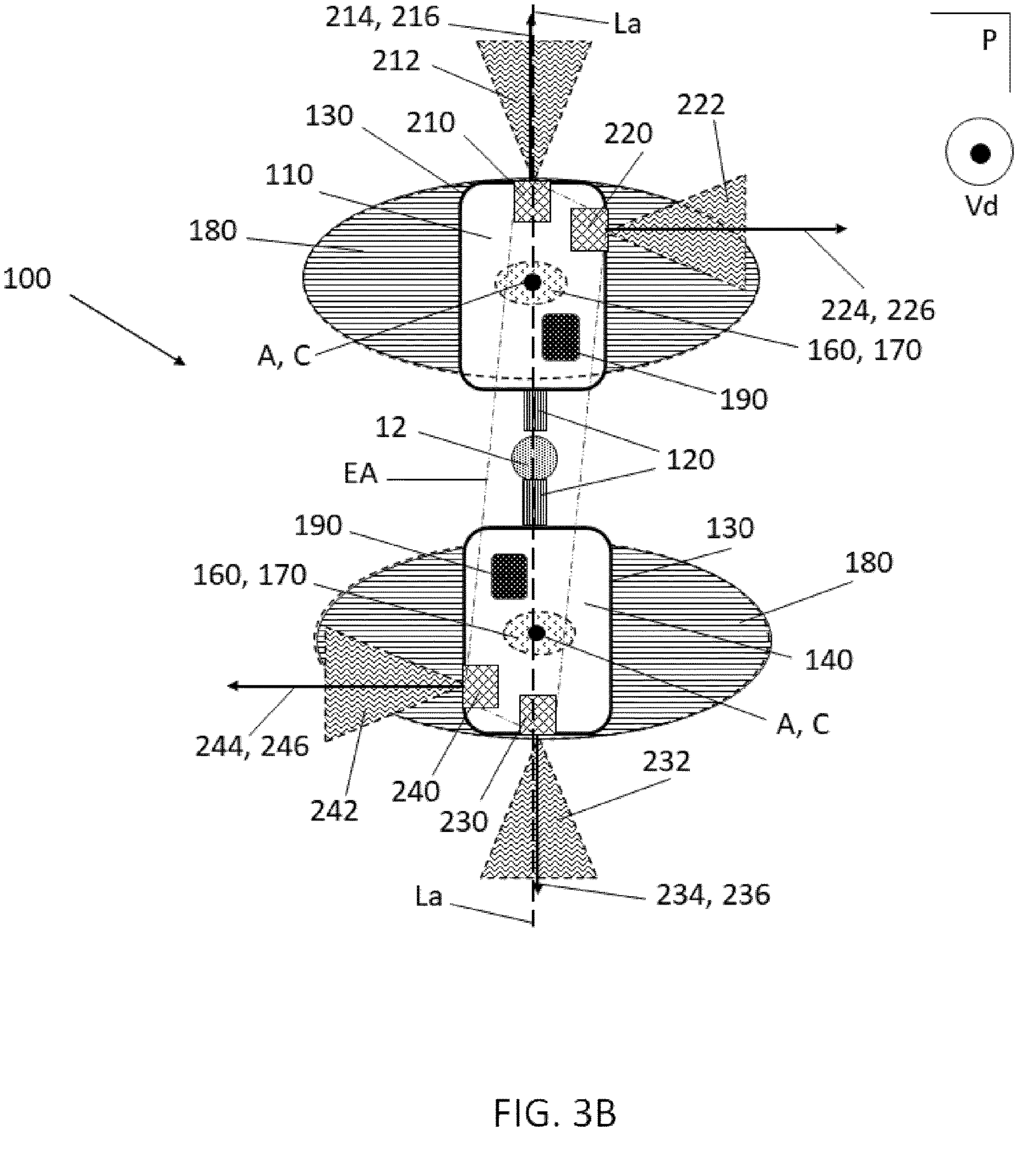

FIG. 3B depicts a detailed top view of the luminaire 100 of FIG. 3A. The first 110 and second luminaire head 140 of the outdoor luminaire 100 are identical to each other, yet mutually oppositely arranged in that they are mutually rotated over 180° over a vertical axis A. Each luminaire head 110, 140 comprises a respective housing 130 having a respective center C and comprising a respective light exit window 150 (as shown in FIG. 3A). The respective mounting element 120 is integrally formed by the respective housing 130 of the respective luminaire head 110, 140. A luminaire axis La extends through said respective centers C and said respective mounting elements 120. A respective lighting unit 160 comprises a respective light source 170 and is accommodated in the respective housing 130, and said respective light source 170 is configured to emit, in operation, a respective beam of illumination light 180 through the respective light exit window (not shown inf FIG. 3B).

The respective housing 130 further accommodates a respective modulation unit 190, and a respective antenna unit comprising two respective antennas. The two antennas in the first luminaire head 110 are considered to be the first 210 and second antenna 220, and the two antennas in the second luminaire head 140 are considered to be the third 230 and fourth antenna 240. The first antenna 210 is configured to issue, in operation, a first directional radiation pattern 212 and has a first line of sight 214 facing in a first direction 216. The second antenna is configured to issue, in operation, a second radiation pattern 222, and has a second line of sight 224 facing in a second direction. The third antenna 230 is configured to issue, in operation, a third directional radiation pattern 232 and has a third line of sight 234 facing in a third direction 236. The fourth antenna 240 is configured to issue, in operation, a fourth radiation pattern 242, and has a fourth line of sight 244 facing in a fourth direction 246. Said first 214, second 224, third 234, and fourth line of sight 244 are within a plane P orthogonal to a vertical direction Vd, being the direction of gravity, in said mounted outdoor luminaire 100. As shown in FIG. 3B the four antennas 210, 220, 230, 240 enclose an enclosed area EA wherein the mounting elements 120 are arranged within said enclosed area EA. As further shown, all lines of sight 214, 224, 234, 244 of the antennas 210, 220, 230, 240 are facing in a direction away from the mounting element 120.

The respective modulation unit 190 is configured for use as a communication node in a wireless data network connected to the first 210 and further antennas 220, 230, 240, and is configured to generate first and further signals for transmission using the first 210 and further antennas 220, 230, 240. A shown each luminaire head 110, 140 comprises a respective modulation unit 190, however, it is also possible that only either the first 110 or the second luminaire head 140 comprises a modulation unit 190, which then is shared by both luminaire heads 110, 140.

As further shown in the FIG. 3A-B, the light source of each luminaire head 110, 140 emits a respective elongated shaped light beam 180. Both the elongated shaped beams are oriented perpendicular to the luminaire axis La and in the same direction as the second 224 and/or fourth line of sight 244.

Figure 4:
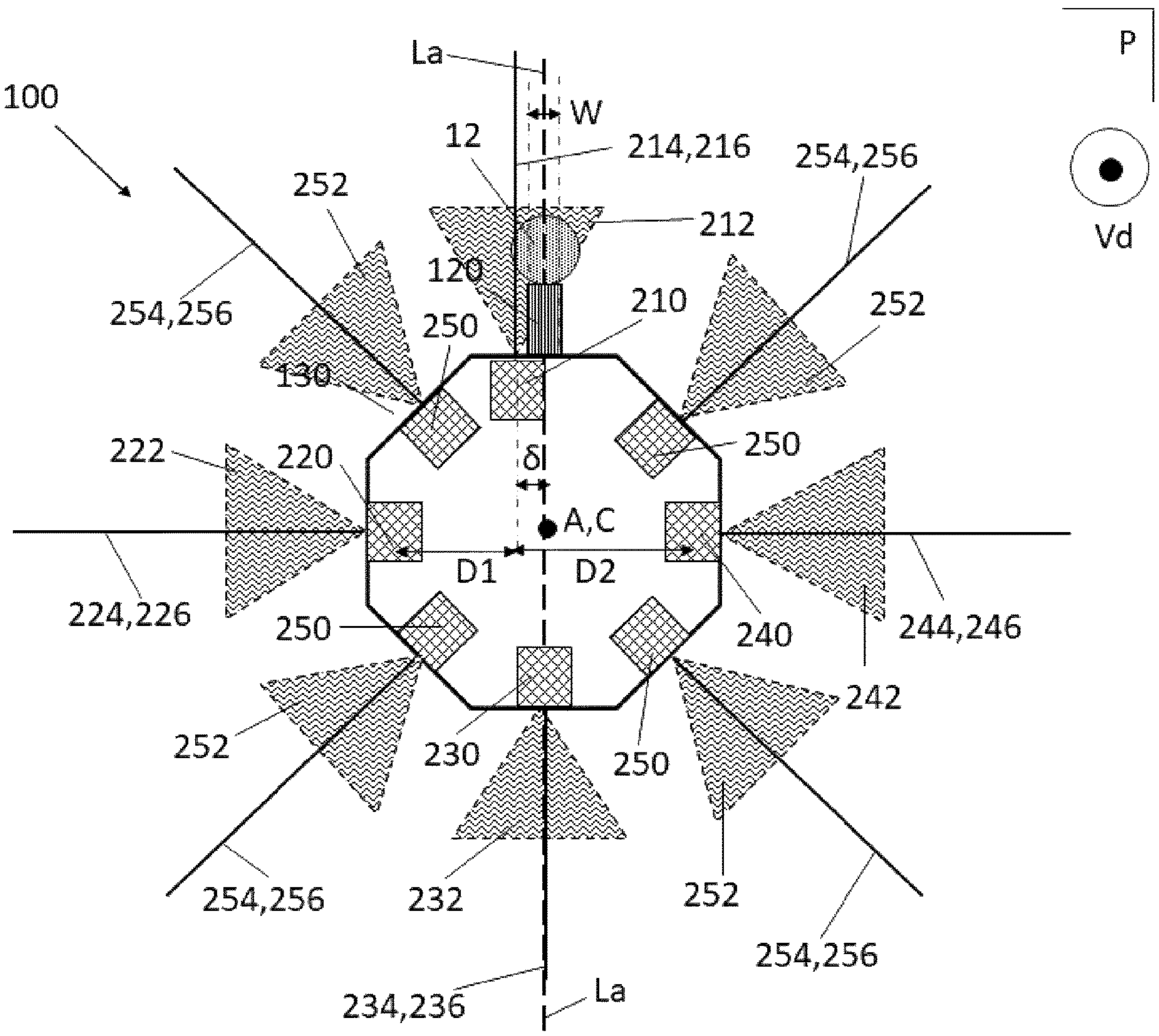
FIG. 4 depicts a fourth embodiment of an outdoor luminaire according to the invention.

FIG. 4 depicts a top view of a fourth embodiment of an outdoor luminaire 100 according to the invention. The luminaire 100 has a single luminaire head 110 and comprises an attached mounting element 120 for mounting onto a pole 12 of an outdoor fixture. The outdoor luminaire 100 comprises a housing 130 having a center C and comprising a light exit window (not shown). The housing 130 is attached to the mounting element 120. A luminaire axis La extends through said center C and said mounting element 120. A lighting unit, a beam of illumination light and a modulation unit are present in the luminaire but not shown for the sake of clarity. The luminaire 100 comprises a first 210 antenna and a second 220, a third 230 and a fourth antenna 240 and four further antennas 250.

The first antenna 210 has a first line of sight 214 facing in a first direction 216 towards the mounting element 120. The further antennas, i.e. the second 220, third 230, and fourth antenna 240, have a further line of sight, i.e. a second 224, third 234, and fourth line of sight 244, facing in a further direction, i.e. a second 226, third 236 and fourth direction 246. Said first 214, second 224, third 234, and fourth line of sight 244 are within a plane P orthogonal to a vertical direction Vd, being the direction of gravity, in said mounted luminaire. The four antennas 210, 220, 230, 240 are mutually oriented in a manner similar to the cardinals of a compass, and as a result thereof so are the four lines of sight 214, 224, 234, 244, as explained with respect to FIG. 1B. In a direction perpendicular to the luminaire axis La, the distance D1 between said at least one first antenna 210 and said at least one second antenna 220 is less than the distance D2 between said at least one first antenna and said at least one fourth antenna, wherein 0.7*D2≈ D1. The further antennas 250 are similarly arranged as the first 210, second 220, third 230 and fourth antenna 240, yet rotated by 45 degrees over a vertical axis A in the direction of gravity (in the mounted configuration of the luminaire) as well as are their further radiation patterns 252 and further lines of sight 254 in their further directions 256.

Figure 5:
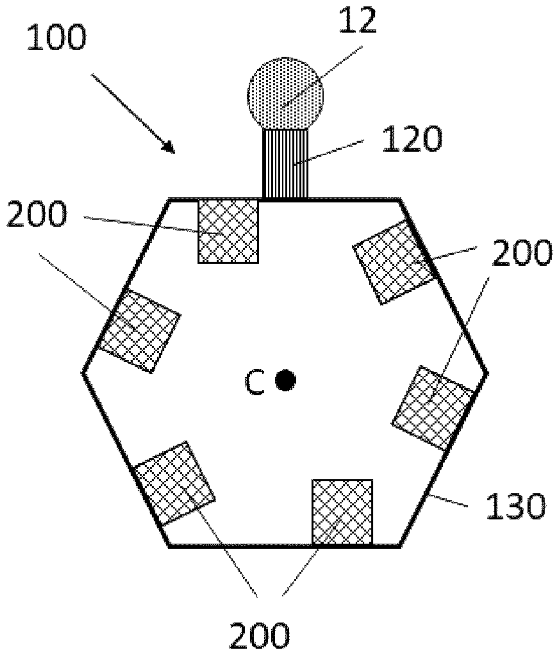
FIG. 5 depicts a fifth embodiment of an outdoor luminaire according to the invention.
Figure 6:
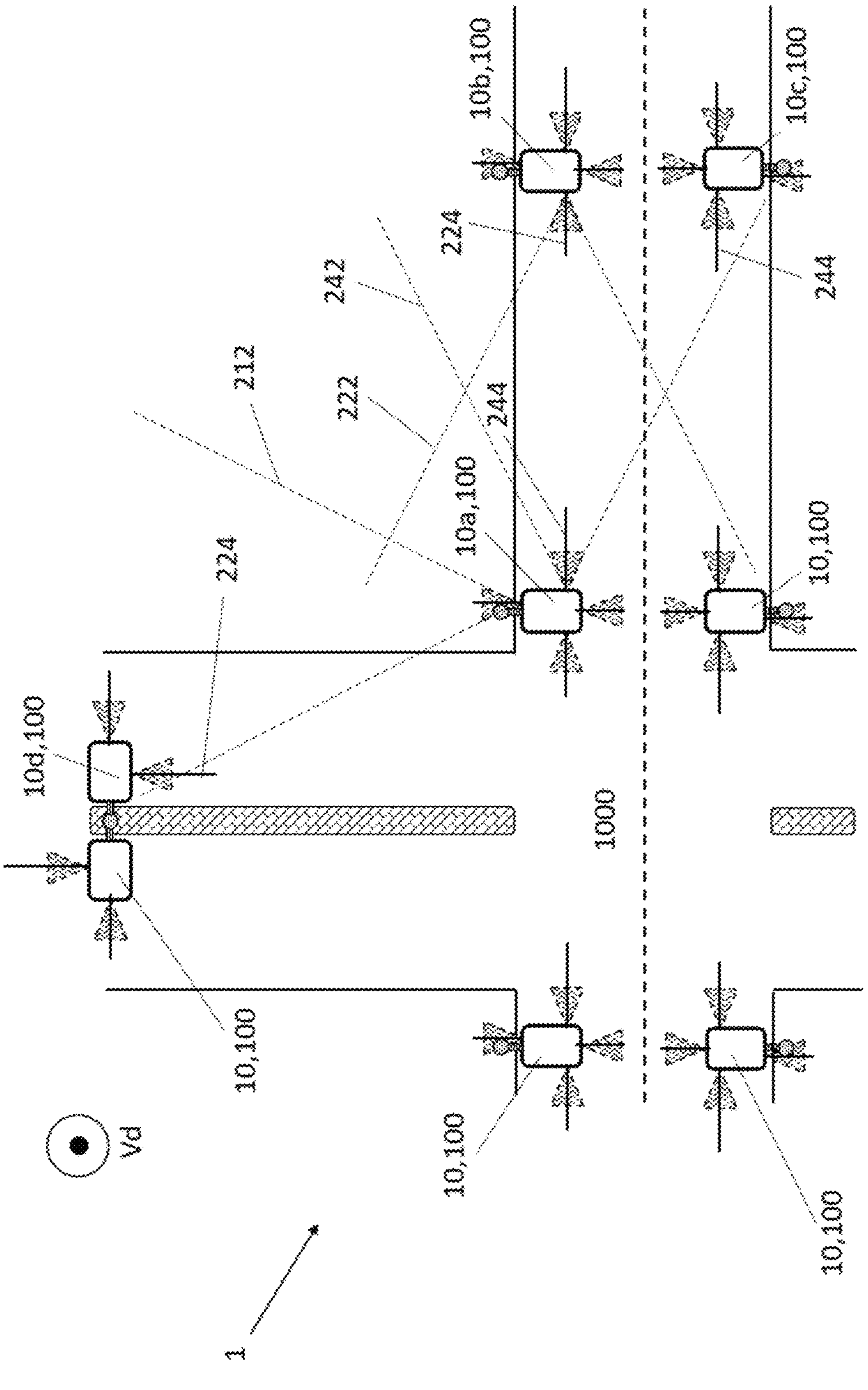
FIG. 6 depicts birds eye view of an example of a crossroad provided with an embodiment of an outdoor lighting system according to the invention.

FIG. 5 schematically depicts a top view of an antenna arrangement of a fifth embodiment of an outdoor luminaire 100 according to the invention. The outdoor luminaire 100 has a group of six antennas 200, arranged according to a six-rotational symmetry around the center C of the six-sided regular polygon housing 130, wherein the antennas are in a slightly shifted position shifted along each respective side of the polygon such that the mounting element 120 and the pole 12 outside the lines of sight of the antennas. FIG. 6 depicts, as seen from a vertical direction Vd, a birds eye view of an example of a crossroad 1000 provided with an embodiment of an outdoor lighting system 1 according to the invention. The outdoor lighting system 1 comprises a plurality of streetlight fixtures 10 arranged alongside the crossroad 1000 and following the street lay-out. In FIG. 4 seven streetlight fixtures 10 are shown that are comprised in a communication network enabling mutual communication. Each streetlight fixture 10 comprises a luminaire 100 according to the invention. As indicatively shown, each luminaire 100 comprises at least one antenna unit comprising four antennas, issues four radiation patterns and has four lines of sight, wherein respectively all antennas, radiation patterns and lines of sight mutually are oriented in a manner similar to the cardinals of a compass, as explained with respect to FIG. 1B. As schematically shown for a first streetlight fixture 10*a*, radiation patterns 212, 242 are emitted in the direction of adjacent streetlight fixtures 10*b*, 10*c* and 10*d*. Said streetlight fixtures 10*b*, 10*c*, and 10*d* have respective line of sights which overlaps (at least one of) the radiation patterns 212, 242 as emitted by the first streetlight fixture 10*a* thus enabling communication, for example data transfer, from the first streetlight fixture 10*a* to further streetlight fixtures 10*b-d*. FIG. 4 shows further that a line of sight 244 of the first streetlight fixture 10*a* overlaps with a radiation pattern 222 emitted from an adjacent further streetlight fixture 10*b* towards the first streetlight fixture 10*a*, thus enabling hence and forth communication between the first streetlight fixture 10*a* and the further streetlight fixture 10*b*. In an analogous manner, hence and forth communication between more, other adjacent streetlight fixtures 10 is similarly enabled, thus forming a communication network.

The invention claimed is:

1. An outdoor luminaire comprising:

a housing having a center and comprising a substantially flat light exit window;

a mounting element attached to or integrally formed by the housing and being configured to mount the luminaire onto a structure;

luminaire axis extending through said center and said mounting element;

a lighting unit comprising a light source, said lighting unit is accommodated in the housing, and said light source is emitting, in operation, an illumination light beam through the light exit window in an average beam direction at an angle Φ between 70-110 degrees with a plane P; and at least a first, second, third and fourth antenna essentially arranged in said plane P and each in a stacked position along the average beam direction with the light exit window, wherein the first, second, third and fourth antenna have respectively a first, a second, a third and a fourth directional radiation pattern and respectively a first, a second, a third, and a fourth line of sight as a respective first, second, third and fourth main direction of respectively the first, second, third and fourth directional radiation pattern, wherein said lines of sight are extending substantially in said plane P and wherein the antennas together cover at least a 300 degrees range in said plane P, and wherein the mounting element is positioned essentially in said plane P outside the line of sight of the antennas.

2. An outdoor luminaire as claimed in claim 1 comprising only a single luminaire head wherein said first radiation pattern is towards the mounting element and wherein first line of sight has an angle α with respect to said luminaire axis, wherein a is in a range from 3 to 20 degrees.

3. An outdoor luminaire as claimed in claim 1 comprising only a single luminaire head, wherein said first radiation pattern is towards the mounting element and wherein said first line of sight is located at a distance δ from said luminaire axis, wherein δ is at least half the width of the mounting element in a direction in said plane P transverse to the luminaire axis.

4. An outdoor luminaire as claimed in claim 1, wherein said first direction is opposite to said third direction and said first line of sight is antiparallel to said third line of sight.

5. An outdoor luminaire as claimed in claim 1, wherein said second direction and said second line of sight are perpendicular to said first line of sight;

wherein said fourth direction is opposite to said second direction and said fourth line of sight is antiparallel to said second line of sight;

wherein in a direction perpendicular to the luminaire axis the distance D1 between said at least one first antenna and said at least one second antenna is less than the distance D2 between said at least one first antenna and said at least one fourth antenna, wherein 0.5*D2<=D1<=0.9*D2.

6. Outdoor luminaire as claimed in claim 4, wherein a virtual first line between the second and fourth antenna and a virtual second line between the third antenna and the mounting element mutually virtually cross to form a virtual cross shape, and the first antenna is asymmetrically arranged with respect to said virtual cross shape.

7. Outdoor luminaire as claimed in claim 1, wherein the light beam is an elongated beam having a beam length direction and second and fourth direction are along the beam length direction.

8. Outdoor luminaire as claimed in claim 1, wherein the light beam is a batwing beam with two lobes extending in a respective first and second lobe direction, and said second and fourth direction are along a respective first and second lobe direction.

9. Outdoor luminaire as claimed in claim 1, wherein the number of antennas in the luminaire is four and the number of luminaire heads is two, wherein the two luminaire heads face in essentially opposite directions, wherein the four antennas are distributed as two antenna units over the two luminaire heads such that the respective line of sights are mutually oriented in a manner similar to the four cardinal directions of a compass and that all antennas face away from the mounting element(s) such that the mounting element is/are outside the line of sight of all four antennas.

10. Outdoor luminaire as claimed in claim 9, wherein each of the two luminaire heads comprises an antenna unit comprising an east and a north antenna or an antenna unit comprising a west and a north antenna.

11. Outdoor luminaire as claimed in claim 1, wherein each antenna is at least partly being accommodated in the housing.

12. Outdoor luminaire as claimed in claim 1, further comprising a modulation unit, internal to the housing, for use as a communication node in a wireless data network connected to the first, second, third, and fourth antenna, the modulation unit being configured to generate one or more signal for transmission using the first, second, third, and fourth antennas.

13. Outdoor luminaire as claimed in claim 12, wherein the modulation unit is provided only in one of the two heads.

14. A streetlight fixture comprising an outdoor luminaire as claimed in claim 1, further comprising a pole as the structure.

15. An outdoor lighting system comprising at least two streetlight fixtures according to claim 14, wherein the at least two streetlight fixtures are mutually in their line of sight and/or communication.

* * * * *